July 12, 1932.  W. O. FROHRING  1,867,403
MEASURING DEVICE FOR MILK POWDERS
Filed Nov. 7, 1927
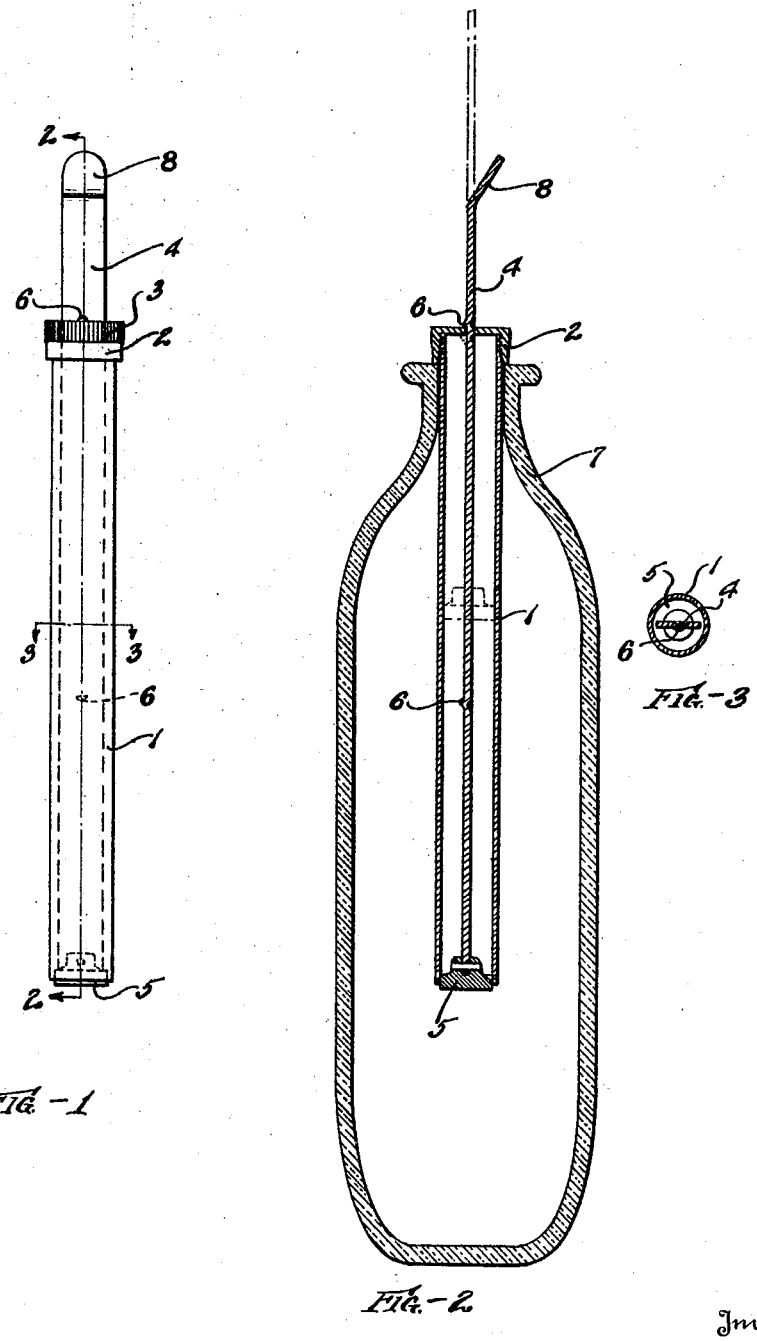

Patented July 12, 1932

1,867,403

UNITED STATES PATENT OFFICE

WILLIAM O. FROHRING, OF SHAKER HEIGHTS, OHIO, ASSIGNOR TO S. M. A. CORPORATION, OF CLEVELAND, OHIO, A CORPORATION OF OHIO

MEASURING DEVICE FOR MILK POWDERS

Application filed November 7, 1927. Serial No. 231,656.

This invention relates to measuring devices for milk powders and the like, its object being to provide a very simple and sanitary device for accurately measuring and transferring to the standard nursing bottle a proper charge of powdered infants' food or the like, without possibility of contamination either of the food powder or of the bottle, and which requires no particular skill for operation.

In the drawing Fig. 1 represents an outside elevation of the device; Fig. 2 is a sectional elevation on the line 2—2, Fig. 1, showing the device inserted into a milk bottle; and Fig. 3 is a cross section on the line 3—3, Fig. 1.

According to present practice, infants' food is marketed in powdered form, usually being put up in sealed cans, from which it is necessary to measure a definite quantity in proportion to the amount of water in which it is dissolved. Tablespoons are notoriously inaccurate measuring devices and some manufacturers have supplied shallow cups or other similar measuring devices, but in all such cases the food receiving surfaces of the measuring cup, as well as the powder in the can or carton, are likely to be contaminated by the fingers. It is also difficult to introduce bulk milk powder from such a measuring cup into the standard nursing bottle through its comparatively small neck.

The present invention, therefore, provides a device which not only overcomes all of these objections but is also very simple and comprises but few parts which are capable of ready sterilization.

Briefly stated, the device comprises a measuring tube which can be plunged into the bulk milk powder in a can so as to become filled with an accurately measured quantity of the powder, and which tube is provided with an extension serving as a handle for its manipulation for so taking up a charge and also as a guide for an ejecting plunger which is actuated with the tube inserted into the neck of a nursing bottle for introducing the charge thereinto, the tube being arranged to closely fit the neck and to be supported thereupon, and its extension preventing any likelihood of contamination of the bottle neck by the hands in the act of ejection.

The device shown for the purpose in the drawing comprises a simple plain tube 1, which may be made of any suitable material capable of sterilization, such as glass or the like, although an aluminum tube is quite suitable. At its ejecting end it is plain and unthreaded, while at its opposite end it has simple threads, shown as external, to receive a cap 2 which may be knurled or roughened at 3, and which has in its end wall an opening through which slides the shank or stem 4 of the ejecting plunger. This shank or stem may be a round rod but is shown as a flat metal strip, to the ejecting end of which is riveted or otherwise secured a plunger head 5.

The parts are so arranged as to limit the possible motion of the plunger head 5 in the tube 1. In its ejecting movement it reaches the forward position shown in full lines Fig. 2, just beyond the open forward end of the tube, so that complete ejection of all food powder is secured. At its other limit of retracting movement the plunger head 5 occupies the rear position shown in dotted lines and the volume of the tube cavity or chamber in advance of the head in this retracted position is made an accurate measure of any desirable definite quantity of the food powder, such as a sufficient quantity of the powder for a normal feeding of four ounces of water. Means is therefore preferably provided to definitely limit the plunger movement and preferably some means which operates without special attention on the part of the operator, such as the teats or projections 6 punched out from the flat surface of the metal strip 4, and arranged to engage the wall of the cap 2. These projections also permanently secure together as one unit the plunger and the cap 2, so that when the cap is unscrewed from the tube there are only two parts to be cleaned or sterilized.

The tube itself can be readily swabbed out and sterilization of all parts can be made complete with certainty. The operator of this device knows that by retracting the plunger to the dotted line position Fig. 2 and plunging the tube into a bulk mass of milk powder, the measuring tube becomes filled with an accurately measured quantity of powder. The tube itself extends materially above its powder holding portion, the extension of the tube above the retracted plunger thereby providing a manipulating or operating handle for taking the sample or charge without touching any of the food in the can with the fingers. This upper extension of the tube also supports the cap 2 and affords an additional bearing or support for the operating rod 4, preventing it from being bent in ejecting the charge.

Fig. 2 shows the device mounted in the neck of a standard nursing bottle 7, which it is made to fit, so that in the bottle charging position the shoulder at the lower edge of the cap 2 rides upon the bottle neck and supports the device in the bottle. Also, the rod 4 is provided with a material extension above the upper projection 6 and which rod extension has a suitable knob or handle such as the laterally bent portion 8. When the filled device is inserted into the bottle neck the operator presses down upon the handle 8 with the palm of the hand, but the rod extension prevents the hand from touching the top of the bottle neck, so that upon withdrawal of the device from the bottle the latter may be capped without possibility of contamination.

This device can be made very cheaply, but nevertheless is sanitary, can be readily sterilized and provides accurate measurement without any high degree of skill or care in its use.

What I claim is:

A sanitary measuring device for milk powder or the like, comprising two cooperating units, to wit, a body formed of a plain elongated tubular member having a smooth uninterrupted inner cylindrical surface from end to end and being open at its forward discharge end and its rear end being externally threaded for attachment of a screw cap thereto, and a combined cap and ejector member comprising a plain cup shaped screw cap adapted for threaded connection to said rear tube end and a plunger member including a stem slidable freely back and forth through an opening in the cap and having an ejecting head on its forward end and bent laterally at its rear end to provide a finger portion and between its ends being provided with longitudinally spaced integral projections which limit its reciprocating motion through the cap and permanently couple the stem and cap, the rear one of said projections being so located that when it is in engagement with the cap the ejecting head extends slightly beyond the forward open tube end to insure complete emptying thereof, and the distance between said projections being materially less than the length of the tube, thereby securing accurate measurement of a definite volume of material to be ejected and enabling the extended rear end of the tube to be utilized as a measuring handle during filling and ejecting, said cap being detachable from the tube for complete exposure, sterilization and cleansing of all surfaces and parts.

In testimony whereof I hereby affix my signature.

WILLIAM O. FROHRING.